United States Patent [19]

Okuno

[11] Patent Number: 5,680,247
[45] Date of Patent: Oct. 21, 1997

[54] OPTICAL AMPLIFICATION MONITORING APPARATUS

[75] Inventor: Hideki Okuno, Tokyo, Japan

[73] Assignee: NEC Corporation, Tokyo, Japan

[21] Appl. No.: 660,283

[22] Filed: Jun. 7, 1996

[30] Foreign Application Priority Data

Jun. 7, 1995 [JP] Japan .................................. 7-140323

[51] Int. Cl.$^6$ ............................ G02B 6/00; H04B 10/17; H01S 3/16
[52] U.S. Cl. .................... 359/341; 359/134; 359/177; 359/194; 359/337
[58] Field of Search .................................. 359/134, 160, 359/177, 187, 194, 337, 341

[56] References Cited

U.S. PATENT DOCUMENTS

| | | | |
|---|---|---|---|
| 5,245,690 | 9/1993 | Aida et al. | 359/341 |
| 5,331,449 | 7/1994 | Huber et al. | 359/160 |
| 5,392,154 | 2/1995 | Chang et al. | 359/341 |
| 5,436,760 | 7/1995 | Nakabayashi | 359/341 |

FOREIGN PATENT DOCUMENTS

| | | |
|---|---|---|
| 6097895 | 4/1994 | Japan . |
| 7202299 | 8/1995 | Japan . |
| 7202306 | 8/1995 | Japan . |

OTHER PUBLICATIONS

Campbell et al, electron. Lett. (GB), vol. 19, #17, pp. 672–674, Aug. 18, 1983.
Oleamoto et al, Electron. Lett., vol. 32, #6, Mar. 14, 1996, pp. 569–570.

*Primary Examiner*—Nelson Moskowitz
*Attorney, Agent, or Firm*—Sughrue, Mion, Zinn, Macpeak, and Seas

[57] ABSTRACT

In an optical amplification monitoring apparatus of the invention, the number of signal light beams actually being transmitted is detected and an optical amplifier is controlled in accordance with the detected number. There is provided a means for monitoring intermodulation light beams resulting from signal light beams of two wavelengths which means includes a nonlinear medium and a WDM coupler that are provided on a light transmission path, an optical fiber grating for allowing passage of only intermodulation light components among the branched light beams, and a photodetector for converting the detected intermodulation light components into currents. A dispersion-shift optical fiber having a zero-dispersion wavelength in the 1.55-μm band is used as the nonlinear medium. Intermodulation light beams are generated only when both signal light beams having different wavelengths w1 and w2 exist in the non-linear medium. Since the intermodulation light beams have different wavelengths than the signal light beams, the number of signal light beams can be detected by monitoring the intermodulation light beams separated from the signal light beams. Thus, in wavelength-multiplexed transmission, optical amplification can be performed independently of the number of signal light beams actually being transmitted.

10 Claims, 3 Drawing Sheets

INPUT

OUTPUT OF NONLINEAR MEDIUM

OUTPUT OF PHOTODETECTOR

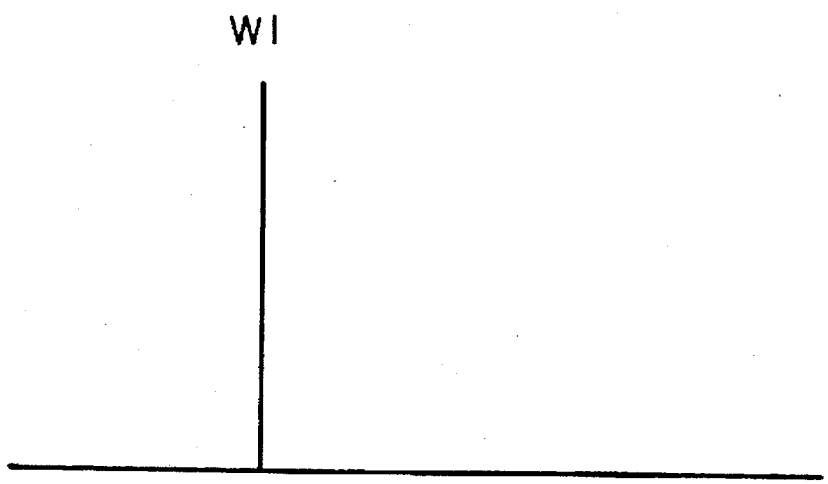
FIG.5(a)
INPUT
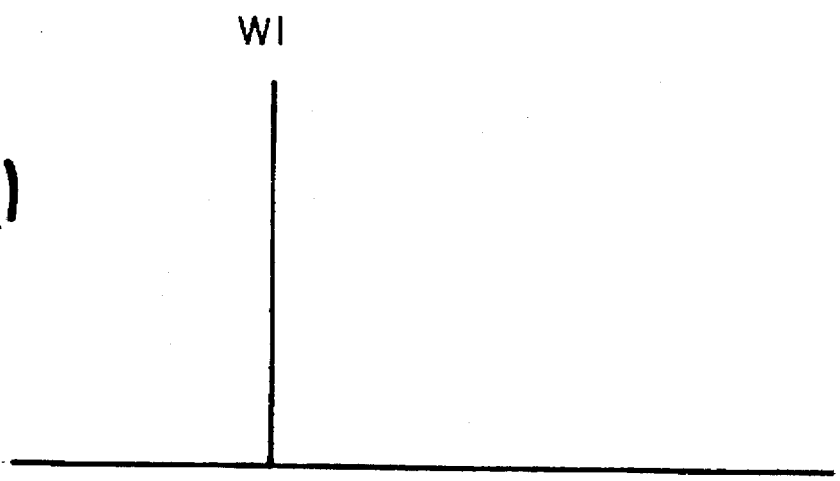
FIG.5(b)
OUTPUT OF
NONLINEAR
MEDIUM
FIG.5(c)
OUTPUT OF
PHOTODETECTOR

1

OPTICAL AMPLIFICATION MONITORING APPARATUS

BACKGROUND OF THE INVENTION

1. Field of the Invention

The present invention relates to an optical monitor to impart an optical monitoring function to an optical communication system.

2. Description of the Related Art

In optical communication systems, a wavelength-multiplexed transmission scheme in which signal light beams of a plurality of wavelengths are transmitted with wavelength multiplexing is well known as a method of increasing the transmission capacity. In this scheme, it is necessary to combine signal light beams of different wavelengths in a transmitting section and to divide a multiplex signal beam into signal light beams of the respective wavelengths in a receiving section. However, these operations are associated with a multiplexing loss and a de-multiplexing loss. Usually, an optical amplifier is used to compensate for these losses.

Commonly known optical amplifiers include a semiconductor amplifier, a fiber Raman amplifier, a fiber Brillouin amplifier, and a rare-earth-doped fiber amplifier. Of those, in particular, an Erbium-doped optical fiber amplifier (EDFA), which belongs to the rare-earth-doped fiber amplifier and uses an Erbium-doped optical fiber as a rare-earth-doped fiber, has various advantages such as being independent of the polarization direction and being capable of pumping by a semiconductor laser. With these advantages, the Erbium-doped optical fiber amplifier is commonly used in actual optical communication systems. In the Erbium-doped optical fiber amplifier, output control is performed to keep a constant optical output level.

In the wavelength-multiplexed transmission scheme as mentioned at the beginning of this description, it is not the case that a plurality of signal light beams, for instance, two signal light beams in the case of multiplexing of two wavelengths, are always transmitted. That is, besides a state that signal light beams of two wavelengths are amplified together by a single Erbium-doped optical fiber amplifier, there is a state that only a signal light beam of only one of the two wavelengths is amplified while amplification of a signal light beam of the other wavelength is stopped. It is necessary to adjust the optical output levels as control targets in accordance with the number of signal light beams which have been inputted.

In wavelength-multiplexed transmission by use of a conventional optical fiber amplifier, optical amplification is performed with the gain set constant irrespective of the number of signal light beams actually being transmitted at a certain time point. The total power of light beams to be input to an optical amplifier depends on the number of signal light beams actually being transmitted: the former increases with the latter.

However, even if the power of pumping light is set at a given value, the amplification gain of an optical fiber amplifier varies with the power of input light beams. Therefore, there exists a problem that a desired gain is not obtained.

SUMMARY OF THE INVENTION

An object of the present invention is to provide an optical amplification monitoring apparatus which can correctly detect the number of signal light beams actually being transmitted in wavelength-multiplexed transmission.

Another object of the invention is to provide an optical amplification monitoring apparatus which can perform optical amplification at a desired gain.

An optical amplification monitoring apparatus according to the invention is a wavelength-multiplexed transmission apparatus comprising a signal light producing section and a wavelength-multiplexed transmitting section. The signal light producing section produces a plurality of signal light beams having different wavelengths. The wavelength-multiplexed transmitting section subjects the plurality of signal light beams to wavelength-multiplexing, and causes wavelength-multiplexed signal light beams to be transmitted through a light transmission path.

The above wavelength-multiplexed transmission apparatus further comprises a number-of-signal-beams detecting section for detecting the number of wavelengths associated with signal light beams actually being transmitted among the plurality of signal light bees; an optical amplification section (optical amplifier) for amplifying the signal light beams; and an optical amplification controlling section for controlling an amplification gain of the optical amplification section in accordance with the detected number of wavelength.

The optical amplification section comprises a pumping light source for producing pumping light; an amplification optical fiber; and an optical coupler for coupling the pumping light to the amplification optical fiber.

As an important feature, the amplification optical fiber is an Erbium-doped optical fiber. The optical amplification controlling section comprises a control circuit for controlling output power of the pumping light.

The number-of-signal-beams detecting section comprises first and second light branching sections, a plurality of light bandpass filters, photodetectors, and a number-of-wavelengths-detecting section. The first optical branching device, which is provided on the light transmission path, branches off parts of the wavelength-multiplexed signal light beams, to thereby produce branched wavelength-multiplexed signal light beams. The second optical branching device divides the branched wavelength-multiplexed signal light beams into divided signal light beams of said number of wavelengths. Each of the optical bandpass filters allows passage of one of the divided signal light beams having one of the wavelengths before the wavelength multiplexing, to thereby produce monitoring signal light beams. The photodetectors, which are connected to the respective optical bandpass filters, convert the monitoring signal light beams into electrical signals, respectively. The number-of-wavelength detecting section detects said number of wavelengths based on the electrical signals.

The number-of-signal-beams detecting section comprises a nonlinear medium for receiving the wavelength-multiplexed signal light beams, and outputting intermodulation light beams thereof; a photodetector for converting the intermodulation light beams into electrical signals; and a detecting section for detecting said number of wavelengths based on the electrical signals. As an important feature, the nonlinear medium is a dispersion shift optical fiber having a zero-dispersion wavelength.

The optical amplification monitoring apparatus further comprises a selective transmission section provided between a optical branching device and the photodetector, for selectively transmitting light in a wavelength range around wavelengths of the intermodulation light beams. As an important feature, the selective transmission section is an optical fiber grating.

To keep the optical outputs of the respective signal light beams at constant levels in a state that signal light beams of a plurality of wavelengths are input, the total optical output level should be set at the optical output level of a signal light beam of a single wavelength multiplied by the number of signal light beams. To this end, in the optical amplification monitoring apparatus of the invention, the input signal light beams are monitored individually to detect the number thereof and the optical outputs are controlled in accordance with the number thus detected.

Apart from the above configurations, the optical amplification monitoring apparatus of the invention is provided with a section for monitoring intermodulation light beams of two-wavelength signal light beams. Intermodulation light beams occur only when both signal light beams of different wavelengths w1 and w2 exist in the nonlinear medium. Since the intermodulation light beams have wavelengths 2w1–w2 and 2w2–w1 that are different from the wavelengths of the signal light beams, the number of input signal light beams can be detected by monitoring the intermodulation light beams that are separated from the signal light beams.

BRIEF DESCRIPTION OF THE DRAWINGS

The above and other objects, features, and advantages of the present invention will become more apparent from the following detailed description when taken in conjunction with the accompanying drawings wherein:

FIGS. 5A to 5C show an operation of the second embodiment of the invention in a case where a single signal light beam is input.

DETAILED DESCRIPTION OF THE PREFERRED EMBODIMENTS

Figure 1:
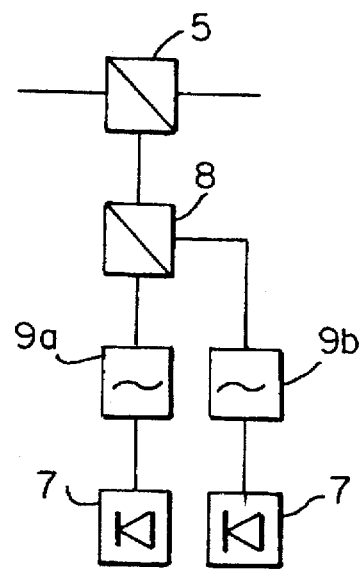
FIG. 1 shows the configuration of an optical amplification monitoring apparatus according to a first embodiment of the invention.

An optical amplification monitoring apparatus of the present invention will be hereinafter described with reference to the drawings. FIG. 1 shows a first embodiment of the invention.

This embodiment includes an optical branching device 5 that is provided on an optical transmission path, and an optical branching device 8. Optical bandpass filters 9a and 9b and PD (photodiode) modules 7a and 7b are provided downstream of the optical branching device 8.

A signal light branched off from the light transmission path by the optical branching device 5 is further divided by the optical branching device 8 into two signal optical beams, which are input to the respective PD modules 7a and 7b via the respective optical bandpass filters 9a and 9b. Each of the optical bandpass filters 9a and 9b transmits only a signal light beam having a wavelength used for wavelength-multiplexed transmission. In the PD module 7a and 7b, the signal light beams of the respective wavelengths are converted to currents and the number of signal light beams currently being input is detected on the basis of the current values.

With the above configuration, an optical amplifier can be controlled in accordance with the number of signal light beams which is always detected. Therefore, optical amplification can be performed while the gain is reliably set at a desired value.

Figure 2:
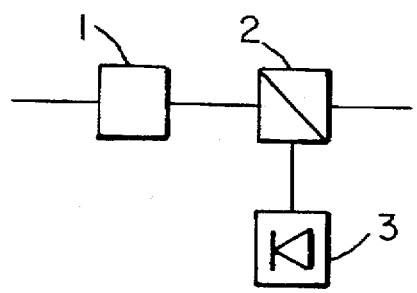
FIG. 2 shows the basic configuration of an optical amplification monitoring apparatus according to a second embodiment of the invention.

However, as seen from FIG. 1, the configuration of the optical amplification monitoring apparatus according to the first embodiment is complex. A description will now be made of an optical amplification monitoring apparatus according to a second embodiment of the invention which apparatus is simple in configuration. FIG. 2 shows the basic configuration of the optical amplification monitoring apparatus according to the second embodiment, and FIG. 3 shows the configuration of a specific version thereof.

In the second embodiment, as shown in FIG. 2, a nonlinear medium 1 and a wavelength multi/de-multiplex (WDM) coupler 2 are provided on a light transmission path. Intermodulation light is branched off by the branching coupler 2 and detected by a photodetector 3, where the branched part is converted into a current to perform monitoring.

In this embodiment, two signal light beams used for wavelength-multiplexed transmission have wavelengths of 1,552 nm and 1,557 nm. The nonlinear medium 1 is specifically an optical fiber transmission path 4 using a dispersion shift optical fiber that has a zero-dispersion wavelength in the 1.55-μm band. When signal light beams of two wavelengths simultaneously travel through the optical fiber transmission path 4, intermodulation light beams are generated due to a nonlinear optical effect. The intermodulation light beams have wavelengths of 1,547 nm and 1,562 nm when the original signal light beams have the above-mentioned wavelengths.

Figure 3:
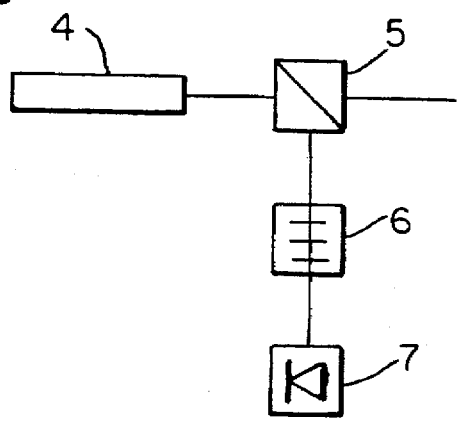
FIG. 3 shows a specific configuration of the optical amplification monitoring apparatus according to the second embodiment of the invention.

In this embodiment, as shown in FIG. 3, a fusion-type light branching device 5 is used as the branching coupler 2 for separating the signal light beams and the intermodulation light beams. An optical fiber grating 6 is provided to reflect the signal light beams. The photodetector 3 is the same as the PD module 7a shown in FIG. 1 (first embodiment). The single PD module is used here in contract to the case of FIG. 1.

As described above, where signal light beams of the two wavelengths 1,552 nm and 1,557 nm travel through the optical fiber transmission path 4, signal light beams of the above wavelengths and intermodulation light beams of the wavelengths 1,547 nm and 1,562 nm are input to the fusion-type light branching device 5, which branches off about 5% in terms of power of each light beam to conduct monitoring. Since the branched signal light beams of the two wavelengths are reflected by the optical fiber grating 6, only the intermodulation light components are input to the photodetector 3, where they are converted into currents. Since intermodulation light beams occur only when two signal light beams travel, the number of input signal light beams can be monitored by monitoring currents flowing through the photodetector 3 and detecting only the existence of intermodulation light beams based on the currents.

Figure 4A:
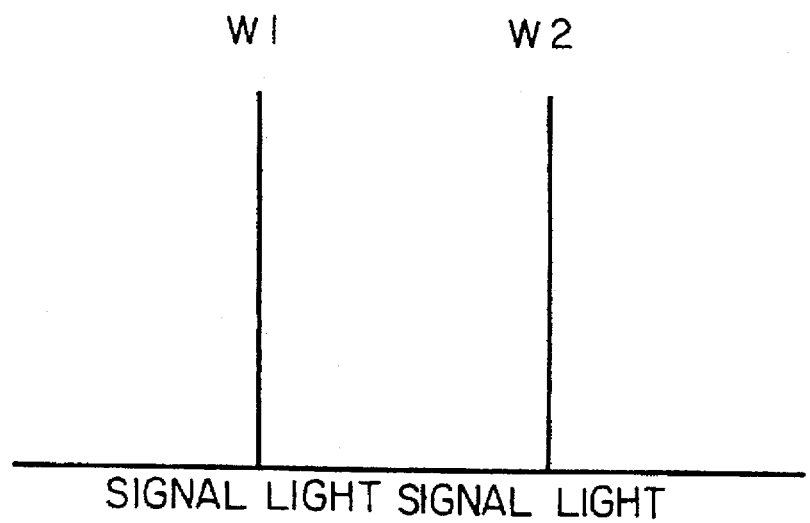
FIGS. 4A to 4C show an operation of the second embodiment of the invention in a case where two signal light beams are input.
Figure 4B:
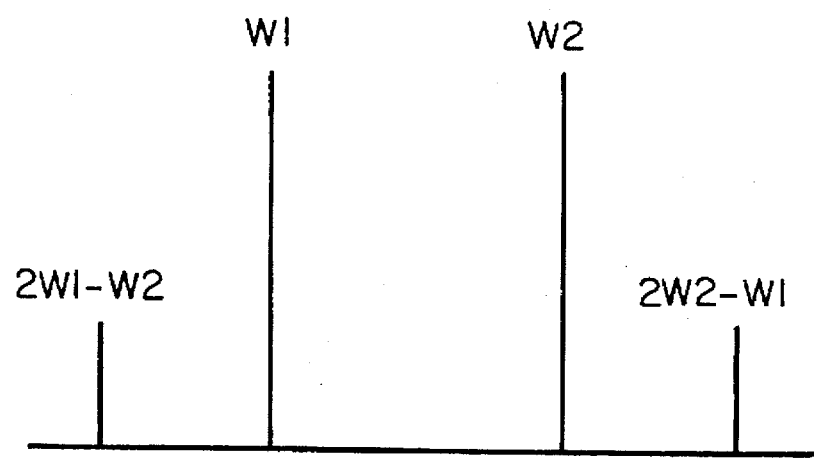
Figure 4C:

FIGS. 4A–4C show an operation of the configuration of the second embodiment in which intermodulation light beams are extracted and their existence is detected. FIG. 4A shows input signal light beams. When these signal light beams pass through the nonlinear medium 1, two intermodulation light beams of wavelengths 2w1–w2 and 2w2 –w1 appear outside the signal light beams of wavelengths w1 and w2 as shown in FIG. 4B. Among these four light beams, the signal light beams w1 and w2 are eliminated through the reflection by the optical fiber grating 6, whereby only the intermodulation light beams can be extracted as shown in FIG. 4C. By detecting the intermodulation light beams by converting those into currents by the photodetector 3, the number of signal light beams can be monitored. On the other hand, where there exists no signal light beam, no intermodulation light beam occurs and no light beam coming out of the optical fiber grating 6 is detected.

FIGS. 5A–5C show an operation of the second embodiment in the case where a single signal light is input. Also in this case, no intermodulation light beam is detected by the photodetector 3.

As described above, in the optical amplification monitoring apparatus of the invention, in wavelength-multiplexed transmission, the number of signal light beams is detected in advance and optical amplification is performed in accordance with the detected number. In particular, the invention is provided with the means for monitoring intermodulation light beams occurring in the nonlinear medium that receives two signal light beams, and only the existence of intermodulation light beams are detected. Therefore, in contrast to the conventional case, the number of signal light beams can be monitored reliably by a simple configuration.

While this invention has been described in connection with certain preferred embodiments, it is to be understood that the subject matter encompassed byway of this invention is not to be limited to those specific embodiments. On the contrary, it is intended for the subject matter of the invention to include all alternatives, modifications, and equivalents as can be included within the spirit and scope of the following claims.

What is claimed is:

1. An optical amplification monitoring apparatus comprising:

signal light producing means for producing a plurality of signal light beams having different wavelengths;

wavelength-multiplexed transmitting means for subjecting the plurality of signal light beams to wavelength-multiplexing, and for causing wavelength-multiplexed signal light beams to be transmitted through an optical transmission path;

number-of-signal-beams detecting means for detecting the number of wavelengths associated with signal light beams actually being transmitted among the plurality of signal light beams;

optical amplification means for amplifying the signal light beams; and optical amplification controlling means for controlling an amplification gain of the optical amplification means in accordance with the detected number of wavelength.

2. The optical amplification monitoring apparatus according to claim 1, wherein the optical amplification means is an optical fiber amplifier comprising:

a pumping light source for producing pumping light;

an amplification optical fiber; and an optical coupler for coupling the pumping light to the amplification optical fiber.

3. The optical amplification monitoring apparatus according to claim 2, wherein the amplification optical fiber is an Erbium-doped optical fiber.

4. The optical amplification monitoring apparatus according to claim 3, wherein the optical amplification controlling means comprises means for controlling output power of the pumping light.

5. The optical amplification monitoring apparatus according to claim 4, wherein the number-of-signal-beams detecting means comprises:

first optical branching device provided on the light transmission path, for branching off parts of the wavelength-multiplexed signal light beams, to thereby produce branched wavelength-multiplexed signal light beams;

second light branching device for dividing the branched wavelength-multiplexed signal light beams into divided signal light beams of said number of wavelengths;

a plurality of light bandpass filters each for allowing passage of one of the divided signal light beams having one of the wavelengths before the wavelength multiplexing, to thereby produce monitoring signal light beams;

photodetectors connected to the respective light bandpass filters, for converting the monitoring signal light beams into electrical signals, respectively;

detecting means for detecting said number of wavelengths based on the electrical signals.

6. The optical amplification monitoring apparatus according to claim 4, wherein the number-of-signal-beams detecting means comprises:

a nonlinear medium for receiving the wavelength-multiplexed signal light beams, and outputting intermodulation light beams thereof;

a photodetector for converting the intermodulation light beams into electrical signals; and detecting means for detecting said number of wavelengths based on the electrical signals.

7. The optical amplification monitoring apparatus according to claim 4, wherein the number-of-signal-beams detecting means comprises:

a nonlinear medium provided on the light transmission path, for receiving the wavelength-multiplexed signal light beams, and outputting intermodulation light beams thereof;

a photodetector for converting the intermodulation light beams into electrical signals; and detecting means for detecting said number of wavelengths based on the electrical signals.

8. The optical amplification monitoring apparatus according to claim 6, wherein the nonlinear medium is a dispersion shift optical fiber having a zero-dispersion wavelength.

9. The optical amplification monitoring apparatus according to claim 7, further comprising selective transmission means provided between an optical branching device and the photodetector, for selectively transmitting light in a wavelength range around wavelengths of the intermodulation light beams.

10. The optical amplification monitoring apparatus according to claim 9, wherein the selective transmission means is an optical fiber grating.

* * * * *